United States Patent Office 3,216,798
Patented Nov. 9, 1965

3,216,798
RECOVERY AND PURIFICATION OF
DECABORANE
Lawrence J. Edwards, Zelienople, and William V. Hough, Gibsonia, Pa., assignors to Callery Chemical Company, Pittsburgh, Pa., a corporation of Pennsylvania
No Drawing. Continuation of application Ser. No. 741,752, June 13, 1958. This application June 6, 1963, Ser. No. 285,890
8 Claims. (Cl. 23—204)

This invention relates to the recovery of decaborane from its alkali metal derivatives.

This application is a continuation of our copending application Serial No. 741,752, filed June 13, 1958, which was a continuation-in-part of Serial No. 571,038, issued as Patent No. 2,993,751 on July 25, 1961.

Our above-mentioned patent describes the new alkali metal derivatives of decaborane which correspond to the formula $MB_{10}H_{13}$, where M is an alkali metal, and methods of preparing them from decaborane and a strongly basic alkali metal compound, such as the hydrides, borohydrides, alkoxy substituted borohydrides, hydroxides and alcoholates of sodium, potassium and lithium. The reaction of decaborane and the strongly basic alkali metal compound to produce the alkali metal decaborane is carried out in an inert organic solvent at temperatures of about 25° C.; suitable solvents include the lower alkyl simple ethers, polyethylglycol dialkylethers and hexane.

The present invention is predicated upon the fact that the alkali metal decaboranes, $MB_{10}H_{13}$, where M is an alkali metal, can be reacted with a hydrogen halide to regenerated decaborane. The alkali metal decaboranes are quite nonvolatile, even in comparison with decaborane, and the toxicity hazard in handling them is considerably less than in the case of decaborane. Thus, the alkali metal decaboranes are a convenient form for transporting, storing, and handling decaborane. This invention provides a method whereby these compounds may be reconverted to decaborane.

The alkali metal decaboranes are reconverted to decaborane upon contacting with a hydrogen halide, as shown by the equation

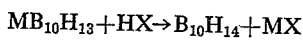

where M is an alkali metal and X is a halogen. A solvent is not necessary to the recovery reaction, but it is usually advantageous to carry out the reaction in an inert liquid medium in order to prevent coating of the alkali metal decaborane with the by-product alkali metal halide, which tends to slow the reaction. Any inert liquid may be used, but the preferred reaction media are those in which the by-product alkali metal halide, but not the decaborane is insoluble. When such a solvent is used the insoluble product precipitates as it is formed, and the decaborane is readily separated from the alkali metal halide during the reaction thus facilitating recovery of the decaborane.

In general, decaborane is soluble only in non-polar solvents while polar solvents are not solvents for decaborane. In contrast, the alkali metal halides are soluble in polar solvents but are not soluble in non-polar solvents. Thus, the use of any solvent which is non-polar makes the recovery reaction easily and simply practiced. For example, when a non-polar solvent, such as pentane, is used, the alkali metal halide formed during the reaction with the hydrogen halide precipitates whereupon the solution can be filtered and pure decaborane recovered by evaporation of the solvent.

The efficiency of this method of recovering decaborane from the alkali metal decaboranes was illustrated by a test in which 0.5952 gram of $NaB_{10}H_{13}$ was added to 2 ml. of diethyl ether in a glass reactor. The reactor was frozen down, evacuated and 5.10 millimols of hydrogen chloride were condensed into it from a vacuum system. The reactor and contents were warmed to 0° C. for one-half hour. Volatile materials were then removed and the decaborane produced was sublimed and weighed. A recovery of 0.4877 gram of decaborane was obtained, representing a 96.4% yield based on the equation

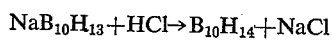

the residue remaining was identified by X-ray analysis as sodium chloride.

Other tests have shown that decaborane may be recovered in a similar manner from the other alkali metal decaboranes, including $LiB_{10}H_{13}$ and $KB_{10}H_{13}$, by reaction with a hydrogen halide, for example, HF, HCl or HBr. As in the case of $NaB_{10}H_{13}$ these reactions may be carried out in a non-aqueous liquid reaction media, for example, dialkyl ethers, polyethyleneglycol ethers, and hydrocarbons, or they may be carried out dry. When the alkali metal decaborane is not soluble in the reaction medium used, it is desirable to suitably disperse the alkali metal decaborane in the liquid in order to promote a faster rate of reaction.

The temperature at which the recovery of the decaborane is carried out is not critical. Room temperature or below is usually most convenient, although higher temperatures may be employed if desired. Similarly, the pressure used is a matter of convenience and does not affect operability. If anhydrous gaseous hydrogen halides are used without a solvent, superatmospheric pressurt is often advantageous; when a solution of a hydrogen halide is used, atmospheric pressure is usually more convenient.

According to the provisions of the patent statutes, we have explained the principle and mode of practicing our invention, have described what we now consider to be its best embodiments. However, we desire to have it understood that within the scope of the appended claims, the invention may be practiced otherwise than as specifically described.

We claim:
1. A method of recovering decaborane from an alkali metal decaborane, $MB_{10}H_{13}$, where M is an alkali metal, which comprises contacting said alkali metal decaborane with a gaseous hydrogen halide and recovering the decaborane thus formed.

2. A method of recovering decaborane from an alkali metal decaborane, $MB_{10}H_{13}$, where M is an alkali metal, which comprises contacting said alkali metal decaborane with a hydrogen halide in the presence of a liquid reaction medium selected from the class consisting of dialkyl ethers, polyethylene glycol ethers and hydrocarbons, and recovering the decaborane thus formed.

3. A method according to claim 2 in which the alkali metal decaborane is sodium decaborane, $NaB_{10}H_{13}$.

4. A method according to claim 2 in which the alkali metal decaborane is lithium decaborane, $LiB_{10}H_{13}$.

5. A method according to claim 2 in which the alkali metal decaborane is potassium decaborane, $KB_{10}H_{13}$.

6. A method of recovering decaborane from an alkali metal decaborane, $MB_{10}H_{13}$, where M is an alkali metal, which comprises contacting said alkali metal decaborane with a hydrogen halide in the presence of diethyl ether.

7. A method of recovering decaborane from an alkali metal decaborane, $MB_{10}H_{13}$, where M is an alkali metal, which comprises contacting said alkali metal decaborane with a hydrogen halide in the presence of pentane.

8. A method of recovering decaborane from sodium decaborane, $NaB_{10}H_{13}$, which comprises contacting a solution of sodium decaborane in diethyl ether with hydrogen chloride, and recovering the decaborane thus formed.

References Cited by the Examiner

Stock et al.: "Zeitschrift fur Anorganische and Allgemeine Chemie," Volume 228, pages 178–192 (1936), copy in Scientific Library.

Guter et al.: "Journal of the American Chemical Society," Volume 78, page 3546 (July 20, 1956), copy in Scientific Library.

MAURICE A. BRINDISI, *Primary Examiner.*